US007114066B1

(12) United States Patent
Swaminathan (10) Patent No.: US 7,114,066 B1
(45) Date of Patent: Sep. 26, 2006

(54) METHOD, APPARATUS, AND COMPUTER-READABLE MEDIUM FOR ENSURING COMPATIBILITY BETWEEN AN OPERATING SYSTEM AND A BIOS REDIRECTION COMPONENT

(75) Inventor: Sivaprasath Swaminathan, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 517 days.

(21) Appl. No.: 10/688,385

(22) Filed: Oct. 17, 2003

(51) Int. Cl.
G06F 9/00 (2006.01)
(52) U.S. Cl. .................... 713/1; 713/2; 714/47
(58) Field of Classification Search ........... 713/1, 713/2, 100; 714/47
See application file for complete search history.

(56) References Cited

U.S. PATENT DOCUMENTS 6,317,798 B1 * 11/2001 Graf ........................... 710/15
6,546,482 B1 * 4/2003 Magro et al. ................. 713/1
6,865,669 B1 * 3/2005 Mahmoud ..................... 713/1
2004/0177245 A1 * 9/2004 Murphy ..................... 713/100

* cited by examiner

Primary Examiner—John R. Cottingham
Assistant Examiner—Paul Yanchus, III
(74) Attorney, Agent, or Firm—Hope Baldauff Hartman, LLC (57) ABSTRACT

Methods, apparatus, and computer-readable media are provided for ensuring compatibility between an operating system and a BIOS redirection component. According to one method, in conjunction with the execution of the BIOS redirection component, a determination is made as to whether the operating system has allocated one or more resources of a computing system in a manner that indicates that a conflict between the BIOS redirection component and the operating system may occur. If the operating system has allocated resources in a manner that indicates that a conflict may occur, computing resources utilized by the BIOS redirection component may be preemptively released in a manner likely to eliminate the possible conflict.

16 Claims, 5 Drawing Sheets

METHOD, APPARATUS, AND COMPUTER-READABLE MEDIUM FOR ENSURING COMPATIBILITY BETWEEN AN OPERATING SYSTEM AND A BIOS REDIRECTION COMPONENT

BACKGROUND OF THE INVENTION

Many desktop and server computer systems utilize a basic input/output system ("BIOS") to control various aspects of the computer system. In particular, the BIOS is commonly utilized to perform a power on self-test, to initialize the various hardware components within the computer system, to provide an interface between an operating system executing on the computer system and the hardware, and to perform various other functions.

One type of function provided by the BIOS in some computer systems, is a remote management function. In particular, some computer systems include the ability to redirect the text screen display of the computer through a serial (RS-232) connection to a remote terminal or terminal emulator. Keystroke input may be received from the remote terminal through the serial connection and provided to the computer system as if the keystrokes were generated locally at the computer system. This process of redirecting the text screen displays and keystroke input (referred to herein as "serial redirection") is commonly utilized by system administrators to administer remote server computers that may not be equipped with a display or a keyboard.

A BIOS redirection component program is responsible for transmitting the text displays to the remote terminal and for receiving keystroke input from the remote terminal. When utilized in conjunction with some 32-bit operating systems, the BIOS redirection component will be overwritten as the operating system performs its initial program load ("IPL" or "boot") and takes control of various system resources, including system memory. Overwriting the program does not cause a conflict within the computing system. However, serial redirection is no longer possible once the program has been overwritten. This is acceptable because most of the common functions performed using serial redirection (e.g. modifying BIOS settings, selecting boot devices, specifying boot options, etc.) have been completed prior to booting the operating system.

When a BIOS, redirection component program for performing serial redirection is used in conjunction with other 32-bit operating systems that provide a GUI, a serious conflict can arise. In particular, a serious conflict can arise that causes the computer system to crash when the operating system overwrites the system resources utilized by the BIOS redirection component program. In many cases, the conflict renders the entire computing system unusable. Because the conflict only occurs in conjunction with the use of certain operating systems and only when serial redirection is enabled, this conflict can be a very difficult condition to diagnose and can be extremely frustrating for a system administrator.

It is with respect to these considerations and others that the present invention has been made.

SUMMARY OF THE INVENTION

In accordance with the present invention, the above and other problems are solved by a method, apparatus, and computer-readable medium for ensuring compatibility between a BIOS redirection component and an operating system. The methods, apparatus, and computer-readable media provided herein can ensure that the utilization of a BIOS redirection component does not conflict with the execution of an operating system.

According to one aspect of the invention, a method is provided for ensuring compatibility between an operating system and a BIOS redirection component. According to the method, the BIOS redirection component is provided by a computer BIOS and is operative to provide redirection facilities for the remote monitoring and operation of the computing system. In particular, the BIOS redirection component is operative to redirect screen displays generated by the computing system to a remote terminal or terminal emulator. The BIOS redirection component is also operative to receive keystrokes generated at the remote terminal and to provide those keystrokes to the computing system as if the keystrokes were provided locally.

According to other aspects of the invention, the BIOS redirection component is operative to execute until the time the operating system is loaded, until the time a boot loader for the computer system has been loaded, or during the entire execution of the computer system. The time period in which the BIOS redirection component operates may be set by a user utilizing a BIOS setup facility or by a system integrator at the time of manufacture.

If the BIOS redirection component is executed during the entire execution of the computer system, it is executed in a manner to eliminate any possible conflict between the operating system and the BIOS redirection component. In particular, in conjunction with the execution of the BIOS redirection component, a determination is made as to whether the operating system has allocated computing resources in a manner that indicates that a conflict between the BIOS redirection component and the operating system may occur. If it is determined that the operating system has allocated computing resources in a manner that indicates that a conflict may occur, the BIOS redirection component is operative to preemptively release resources utilized by the BIOS redirection component in a manner designed to eliminate the possible conflict with the operating system.

According to other aspects of the invention, the process of determining whether the operating system has allocated system resources in a manner that indicates that a conflict may occur with the BIOS redirection component may include monitoring the contents of a memory location within the computer system to determine if the operating system has taken control of the memory location and written data to the memory location. According to various aspects of the invention, the memory location may comprise at least a portion of an interrupt vector table utilized to store the memory location of interrupt handlers for software interrupts utilized by the BIOS redirection component and the operating system.

According to even other aspects of the invention, the BIOS redirection component may preemptively release one or more software interrupts and one or more hardware interrupts if it is determined that the operating system has allocated resources in a manner that indicates that a conflict may occur. By preemptively releasing these interrupts and potentially other computing resources in view of a potential conflict, the BIOS redirection component may terminate its execution gracefully and avoid any potential conflict with the operating system.

According to various aspects of the invention, a computer readable media comprising computer executable instructions for performing the various methods provided herein are also provided. Additionally, a computer controlled apparatus capable of performing the various methods described herein are also provided. These and various other features as well as advantages, which characterize the present invention, will be apparent from a reading of the following detailed description and a review of the associated drawings.

DETAILED DESCRIPTION OF THE INVENTION

As described briefly above, embodiments of the present invention provide methods, apparatus, and computer-readable media for ensuring the compatibility of an operating system and a BIOS redirection component. In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1:
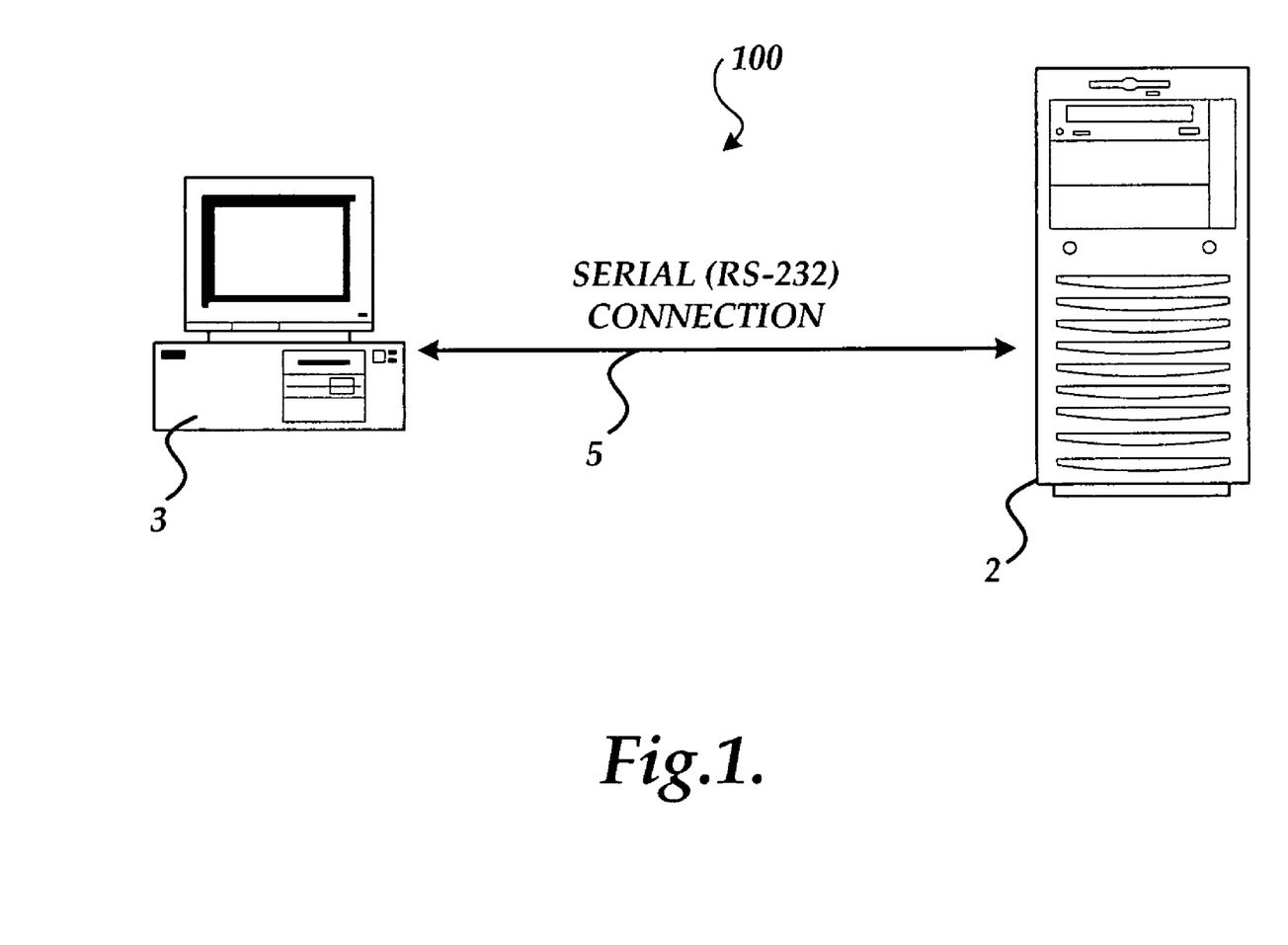
FIG. 1 is a network diagram illustrating a general operating environment for embodiments of the present invention.

Referring now to the drawings, in which like numerals represent like elements throughout the several figures, aspects of the present invention and the illustrative operating environment will be described. FIG. 1 and the following discussion are intended to provide a brief, general description of a suitable computing environment in which the invention may be implemented. While the invention will be described in the general context of avoiding a conflict between a BIOS redirection component and an operating system program, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules or data files may be located in both local and remote memory storage devices.

Turning now to FIG. 1, a general operating environment for embodiments of the present invention will be described. As shown in FIG. 1, a system 100 is provided according to the various embodiments of the invention. The system 100 includes a computing system 2 configured with remote management capabilities. In particular, the computing system 2 is configured for serial BIOS redirection. As will be described in greater detail below, a BIOS is utilized to control various aspects of the operation of the computing system 2. Specifically, the BIOS includes a redirection component that is operative to redirect the text displays provided by the computing system 2 to a remote terminal or a terminal emulator executing on a remote computer, such as the remote computer 3, via a RS-232 serial port connection 5 or other connection type. The BIOS redirection component is also operative to receive keystrokes generated at the remote terminal or remote computer 3 and to provide those keystrokes to the computing system 2 as if the keystrokes were generated locally at the computing system 2. In this manner, aspects of the operation of the computing system 2 may be controlled from the remote computer 3 without a display, keyboard, mouse, or any type of input device being physically connected to the computing system 2.

The BIOS redirection features of the computing system 2 allow a user of the remote computer 3 to control various aspects of the operation of the computing system 2. For instance, utilizing the remote computer 3, a user could access a BIOS setup menu provided by the BIOS of the computing system 2 to modify settings or make other changes. Utilizing the BIOS redirection features of the computing system 2, a user of the remote computer 3 may also view the progress of an IPL of the computing system 2, including any progress or error messages generated by the computing system 2 during boot. Additionally, a user of the remote computer 3 may also be able to specify boot options supported by a particular operating system. For instance, the WINDOWS family of operating systems from MICROSOFT CORPORATION of Redmond, Wash., provide a user with a startup menu in response to the selection of a particular key ("F8"). The startup menu allows a user to specify how the IPL of the computing system 2 should take place. Menu options for booting in a "safe" mode, a normal mode, a logged mode, a step-by-step mode, a confirmation mode, a command prompt mode, and a safe command prompt mode may be presented to a user. The user of the remote computer 3 may then select the appropriate menu option at the remote computer 3.

When used in conjunction with a 32-bit operating system that utilizes a GUI, BIOS redirection is typically terminated when the GUI is instantiated at the computing system 2. However, a user may choose to boot the computing system 2 in a command prompt mode. The command prompt mode is a text-only mode in which the user may execute programs and enter commands directed to the computing system 2. If the user chooses to boot the computing system 2 in the command prompt mode, BIOS redirection can be utilized for the entire computing session. BIOS redirection may also be utilized for the entire computing session when utilized in conjunction with operating systems that do not utilize a GUI, such as the MS-DOS and FREE DOS operating systems.

As discussed briefly above, the BIOS redirection facilities of the computing system 2 may be configured using a setup menu provided by the BIOS to operate only until the time the operating system begins to boot, only until the time a boot loader configured for use with the computing system 2 has been loaded, or in a continual manner, even after the operating system has been loaded. In many cases, it is advantageous to configure the BIOS redirection facility to execute continually so that a user can view error and status messages generated by the operating system during IPL or to make selections from the operating system startup menu described above. However, when utilized in conjunction with some operating systems, a conflict will occur as the operating system begins to IPL and allocate system resources when the BIOS redirection component is configured for constant execution. When this conflict occurs, the computing system 2 may encounter a program error resulting in a system crash. The embodiments of the invention address this problem and allow the BIOS redirection component to be executed for as long as possible without a conflict, even when used in conjunction with operating systems that may otherwise cause a crash of the computing system 2.

Figure 2:
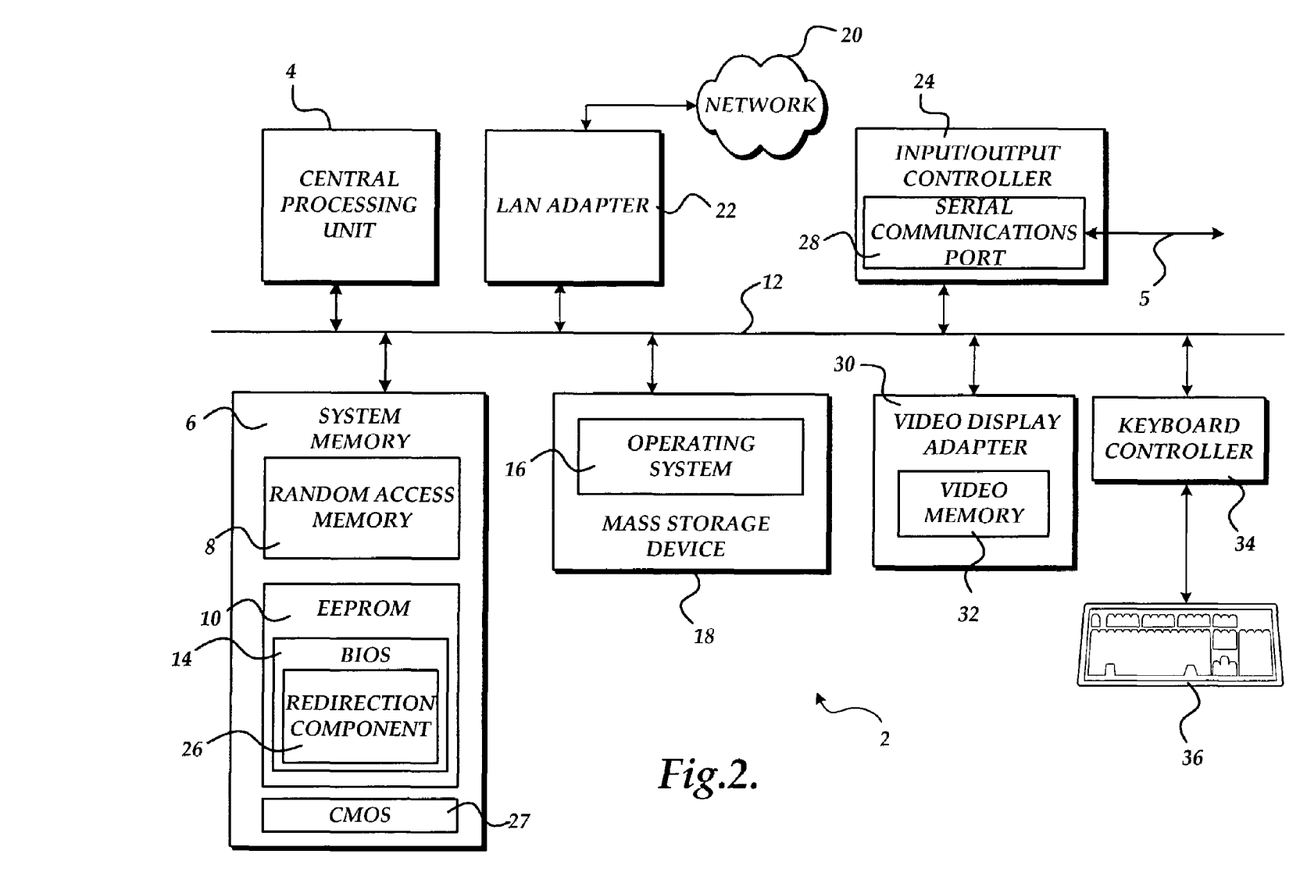
FIG. 2 is a block diagram illustrating a computer hardware and software architecture utilized in the various embodiments of the invention.

Turning now to FIG. 2, an illustrative computer architecture for a computing system 2 utilized in the various embodiments of the invention will be described. The computer architecture shown in FIG. 2 illustrates a conventional desktop or server computer, including a CPU 4, a system memory 6, including a RAM 8, an EEPROM 10 and a CMOS memory 27, and a system bus 12 that couples the memory to the CPU 4. A BIOS 14 containing the basic routines that help to transfer information between elements within the computer, such as during startup, is stored in the EEPROM 10. The BIOS 14 is executed by the CPU 5 when the computer 2 is powered on. The BIOS 14 performs a number of functions at startup of the computer 2, including discovering and initializing the RAM 8, copying the contents of the BIOS 14 to the RAM 8, executing the BIOS 14 to perform a power on self-test ("POST") routine, and to pass control of the computer 2 to an operating system 16. Once the operating system 16 has been loaded, aspects of the BIOS 14 may be utilized to manage data flow between the operating system 16 and devices attached to the computer 2, such as a mass storage device 18, a video display adapter 30, a keyboard controller 34, a keyboard 36, a mouse and a printer. The CMOS memory 27 is a battery-backed memory device that is used by the BIOS 14 to store setting information for the computer 2.

As known to those skilled in the art, the BIOS 14 is an integral part of the computer 2 and is typically shipped with the computer 2 from the manufacturer. The BIOS 14 is made accessible to the CPU on an EEPROM device 10. When the computer 2 is powered on, the CPU 4 passes control to the BIOS 14, which is always located at the same place in the memory architecture of the computer 2. By utilizing the BIOS 14, the operating system 16 and its applications are freed from having to understand exact details, such as hardware addresses, about input/output devices attached to the computer 2. As described in greater detail herein, the BIOS 14 includes a redirection component 26. As previously discussed, the redirection component 26, includes program code for redirecting the text screen displays of the computer 2 to a remote computer 3 via the serial communications port 28 and the serial connection 5. The redirection component 26 also includes program code for receiving keystrokes generated at the remote computer 3 via the communications port 28. When received, the redirection component 26 places the keystrokes in a key buffer maintained by the keyboard controller 34, so that the keystrokes appear to have been received from a keyboard 36, which may or may not be connected to the computer 2. In order to perform these functions, the redirection component 26 may use one or more software or hardware interrupts available through the computer 2.

The computing system 2 further includes a mass storage device 18 for storing an operating system 16, application programs, and other program modules. The mass storage device 18 is connected to the CPU 4 through a mass storage controller (not shown) connected to the bus 12. The mass storage device 18 and its associated computer-readable media, provide non-volatile storage for the computing system 2. Although the description of computer-readable media contained herein refers to a mass storage device, such as a hard disk or CD-ROM drive, it should be appreciated by those skilled in the art that computer-readable media can be any available media that can be accessed by the computing system 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computing system 2.

According to various embodiments of the invention, the computing system 2 may operate in a networked environment using logical connections to remote computers through a network 20, such as the Internet. The computing system 2 may connect to the network 20 through a network interface unit 22 connected to the bus 12. It should be appreciated that the network interface unit 22 may also be utilized to connect to other types of networks and remote computer systems. A video display adapter 30 may also be utilized within the computing system 2 to provide a visual output. The video display adapter 30 may include a video memory 32 for storing screen displays. The video memory 32 may be accessed by the redirection component 26 to generate the screen displays for transmission to the remote computer 3. It should be appreciated that the video display adapter 30 need not be utilized in conjunction with an actual display.

The computing system 2 may also include an input/output controller 24 for receiving and processing input from a number of other devices, including a keyboard, mouse, or electronic stylus (not shown in FIG. 2). Similarly, an input/output controller 24 may provide output to a printer, or other type of output device. The input/output controller 24 may also include one or more serial communications ports 28 for connection to a remote computer 3 via the RS-232 serial connection 5. As discussed herein, the serial communications port 28 may be used for redirection. Other types of communications connections may also be utilized for redirection.

As mentioned briefly above, a number of program modules and data files may be stored in the mass storage device 18 and RAM 8 of the computer 2, including an operating system 16 suitable for controlling the operation of a networked personal or server computer, such as one of the family of WINDOWS operating systems or the MS-DOS operating system from MICROSOFT CORPORATION of Redmond, Wash. Other operating systems may also be utilized, such as the LINUX operating system or the FREE DOS operating system.

Figure 3:
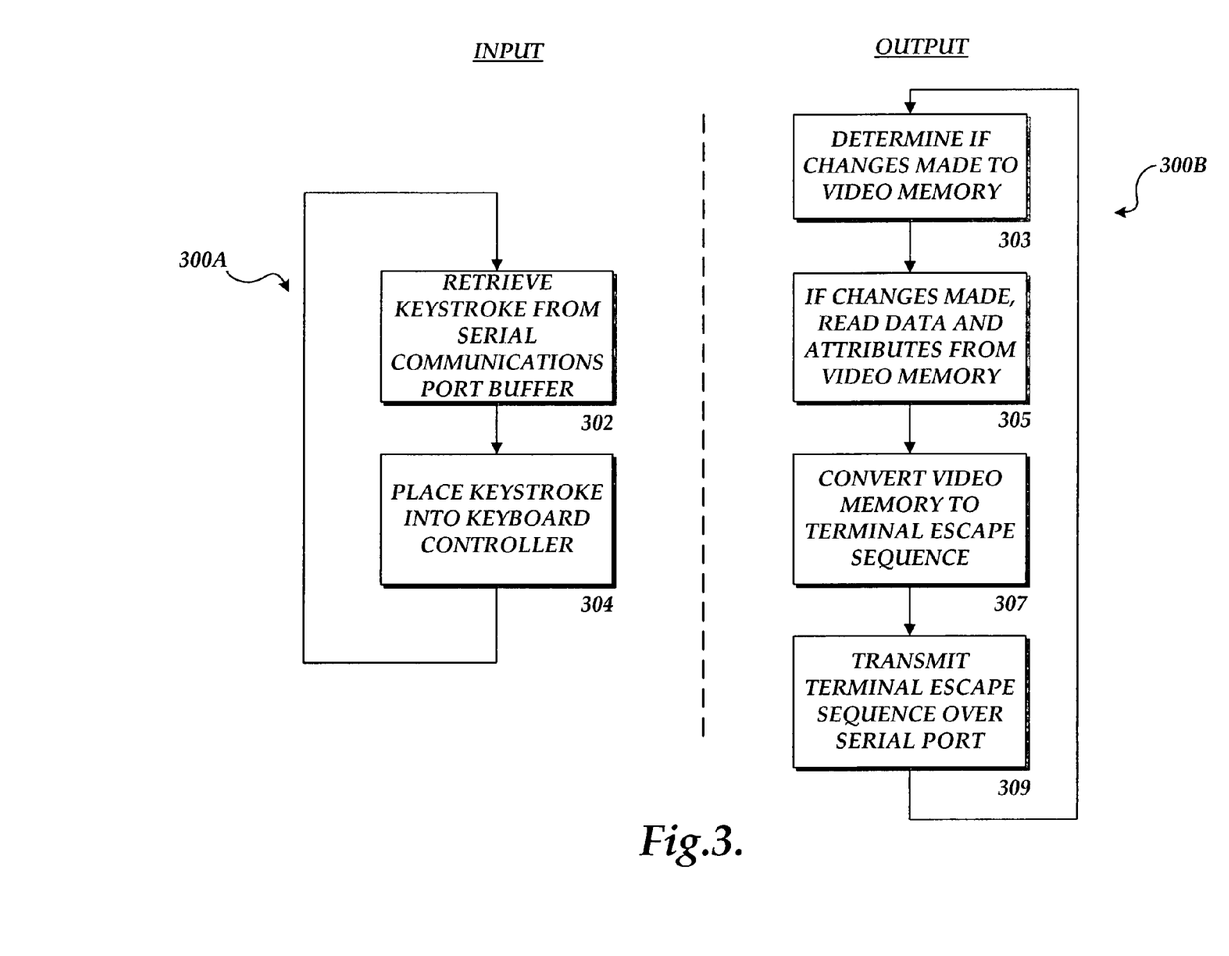
FIG. 3 is a flow diagram showing an illustrative process for performing serial redirection within a computing system.

Turning now to FIG. 3, several flow diagrams will be described illustrating a method for redirecting the output of the computer 2. It should be appreciated that the logical operations of the various embodiments of the present invention, including those shown in FIG. 3 and in FIG. 5, described below, are implemented (1) as a sequence of computer implemented acts or program modules running on a computer system and or (2) as interconnected machine logic circuits or circuit modules within the computer system. The implementation is a matter of choice dependant upon the performance requirements of the computer system implementing the invention. Accordingly, the logical operations making up the embodiments of the present invention described herein are referred to variously as operations, structural devices, acts, or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

FIG. 3 illustrates two separate routines that are together executed by the BIOS redirection component 26 to provide the redirection facility. In particular, the routine 300A illustrates a process for receiving input from the remote computer 3. As shown in FIG. 3, the routine 300A begins at operation 302, where an interrupt is generated by the computer 2 indicating that a keystroke has been received from the remote computer 3 via the serial communications port 28. In response to the interrupt, the BIOS redirection component 26 retrieves the keystroke from a buffer maintained within the serial communications port 28 at operation 302.

At operation 304, the BIOS redirection component 26 places the keystroke in a buffer maintained within the keyboard controller 34. The keystroke is placed in the buffer in the same manner as keystrokes generated by a keyboard that is physically connected to the computer 2. In this manner, keystrokes received at a remote terminal 3 can be entered at the computer 2 as if the user was local to the computing system. From operation 304, the routine 300A returns back to operation 302, where additional keystrokes are continually processed.

FIG. 3 also shows an illustrative routine 300B. The routine 300B illustrates a process performed by the BIOS redirection component 26 for redirecting the text screen display of the computer 2 to the remote computer 3. This process begins at operation 303, where the computer 2 determines if any changes have been made to the contents of the video memory 32 such as, for instance, when data is written to the display screen. If changes have been made, the routine 300B continues to operation 305, where the changed data, including the character text and any attributes, are read from the video memory 32.

Once the data has been retrieved from the video memory 32, the routine 300B continues to operation 307, where the data from the video memory 32 is converted by the BIOS redirection component 26 to a terminal escape sequence compatible with a terminal emulator executing on the remote computer 3 or a remote terminal. The converted characters are then transmitted to the remote computer 3 by the BIOS redirection component at operation 309. From operation 309, the routine 300B returns to operation 303, where additional changes to the video display may be identified, processed, and transmitted to the remote computer 3.

Figure 4:
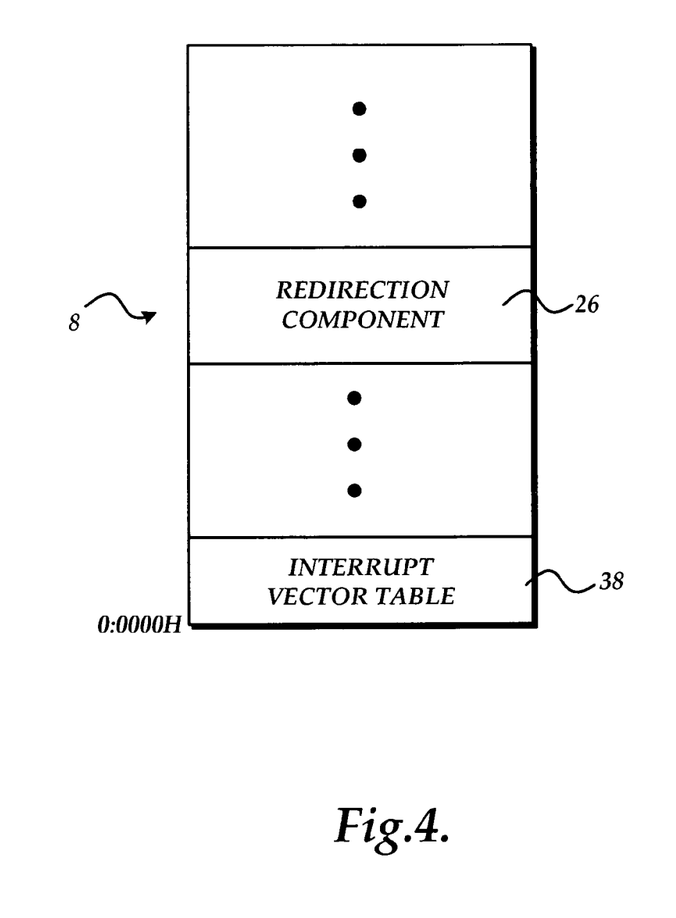
FIG. 4 is a block diagram illustrating the contents of a memory utilized by a computing system in one embodiment of the invention.

Turning now to FIG. 4, the contents of a memory utilized by a computing system when providing a redirection facility in one embodiment of the invention will be described. As shown in FIG. 4 and described briefly above, the BIOS redirection component 26 is copied from the EEPROM 10 into the RAM 8 for execution. However, as the operating system 16 begins to load on the computer 2, the operating system 16 begins to allocate the resources of the computer 2 for itself. These resources include the RAM 8. Therefore, as the IPL of the computer 2 progresses, the operating system 16 will take control of portions of the RAM 8, including the portion of the RAM 8 storing the redirection component 26.

When the operating system 16 overwrites the redirection component 26 in the RAM 8, a conflict may occur resulting in a crash. Similarly, as the load of the operating system 16 progresses, the operating system 16 may allocate to itself a portion of the RAM 8 that stores an interrupt vector table 38. As known to those skilled in the art, the interrupt vector table 38 is utilized to store interrupt vectors. Interrupt vectors consist of memory addresses that identify the addresses of interrupt handlers for each interrupt that may occur within the computer 2. For example, an interrupt handler may be utilized by the BIOS redirection component 26 to retrieve a keystroke when received at the serial communications port 28.

If the operating system 16 overwrites the contents of the interrupt vector table 38 during operation, a conflict may occur between the BIOS redirection component 26 and the operating system 16 that may render the computer 2 unusable. Accordingly, the BIOS redirection component monitors the allocation of resources to the operating system 16 and preemptively releases all resources, thereby avoiding a conflict, it if its determined that the operating system 16 has allocated resources, such as the contents of the RAM 8 utilized for the interrupt vector table 38, that may cause a conflict. Details regarding the process performed by the BIOS redirection component 26 to avoid such a conflict are provided below with respect to FIG. 5.

Figure 5:
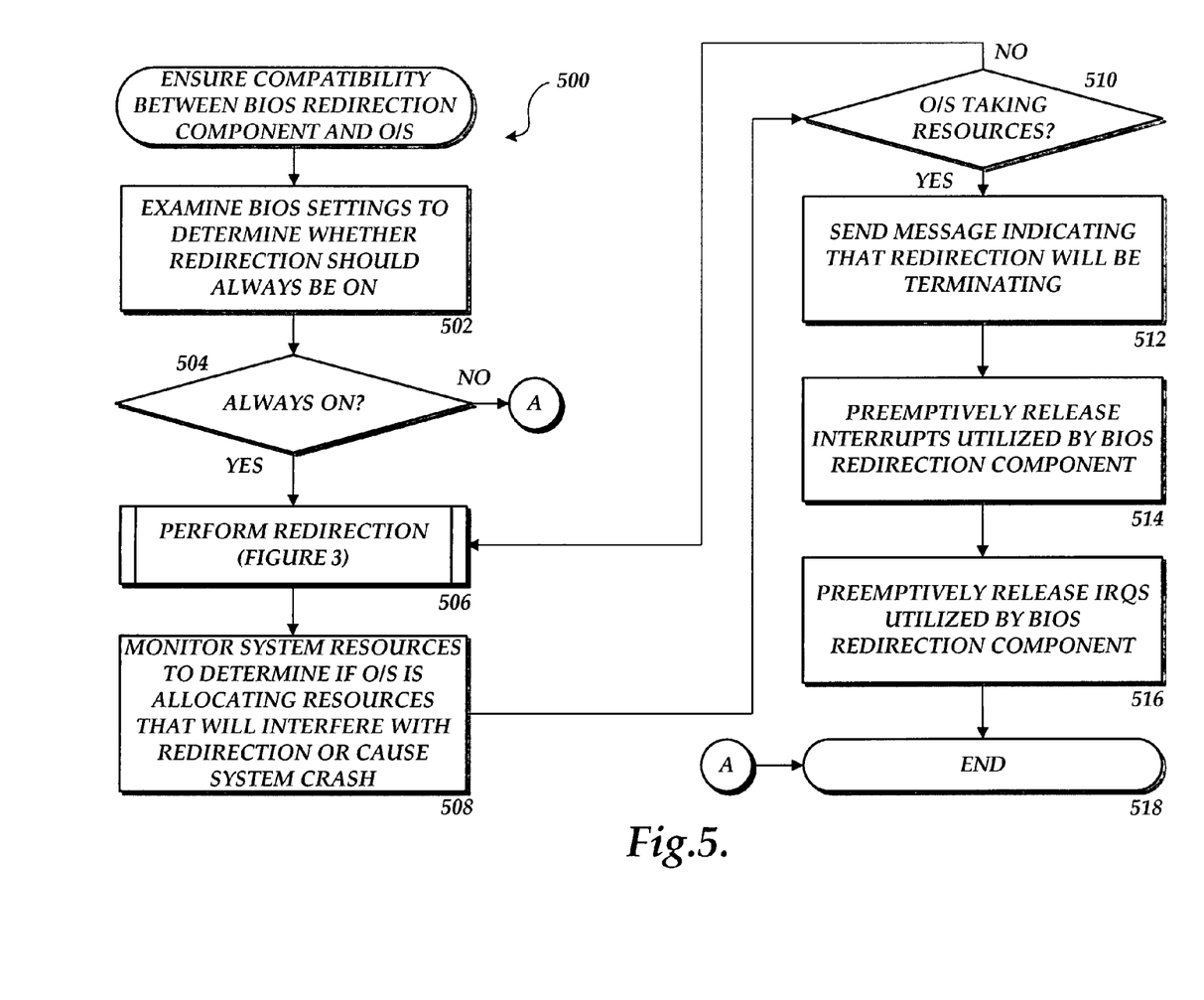
FIG. 5 is a flow diagram showing an illustrative process for ensuring compatibility between an operating system and a BIOS redirection component according to one embodiment of the invention.

Referring now to FIG. 5, a routine 500 will be described that illustrates a process for ensuring compatibility between a BIOS redirection component and an operating system according to one embodiment of the invention. As shown in FIG. 5, the routine 500 begins at operation 502, where a determination is made as to whether the BIOS redirection component 26 should be continually executed, even after the loading of a boot manager and the operating system 16. As described above, according to one embodiment, the BIOS redirection component 26 may be configure to operate only until such time as a boot loader has completed execution, until the time the operating system begins execution, or continually. This setting may be made by a user utilizing a BIOS setup facility or specified at the factory. Accordingly, this determination may be made by examining the contents of the CMOS 27.

If, at operation 502, it is determined that the BIOS redirection component 26 should not be executed continuously, the routine branches from operation 504 to operation 518, where it ends. Otherwise, the routine 500 continues from operation 504 to operation 506. At operation 506, the BIOS redirection component 26 begins the process of redirecting the text screen displays of the computer 2 to the remote computer 3 and receiving input. This process is described above with respect to FIG. 3.

In conjunction with the redirection process, the routine 500 continues from operation 508, where a determination is made by the BIOS redirection component 26 as to whether the operating system 16 has allocated resources in a manner that may conflict with the operation of the BIOS redirection component 26 or the computer 2. For instance, according to one embodiment of the invention, the BIOS redirection component 26 monitors the contents of a memory location within the to determine if the operating system has written to the memory location. Data written to the memory location may indicate that the operating system has allocated the RAM 8 including the memory location for itself and that a conflict is imminent.

According to another embodiment, the BIOS redirection component may monitor the contents of one or more memory locations within the interrupt vector table 38. For instance, the BIOS redirection component may monitor a memory location within the interrupt vector table 38 that is utilized to specify a timer interrupt for the computer 2. In a computer 2 utilizing the MICROSOFT-INTEL memory architecture, this location would be specified as 0:20h. Modification of this memory location indicates that the operating system 16 is allocating to itself resources that may cause a conflict with the execution of the BIOS redirection component 26.

From operation 508, the routine 500 continues to operation 510, where a determination is made as to whether the operating system 16 is allocating to itself resources that may cause a conflict with the execution of the BIOS redirection component 26. If the operating system 16 is not allocating such resources, the routine 500 returns to operation 506, where the redirection process continues. If, however, the operating system 16 is allocating resources that may cause a conflict, the routine 500 continues from operation 510 to operation 512.

At operation 512, a message may be optionally transmitted to the remote computer 3 indicating that redirection will be terminating. Once the message has been sent, the routine 500 continues to operation 514, where the BIOS redirection component 26 preemptively releases all of the computing resources it has been utilizing. For instance, according to various embodiments of the invention, the BIOS redirection component 26 may release the software interrupts it has been using. The routine 500 then continues to operation 516, where the BIOS redirection component 26 releases all of the hardware interrupts (IRQs) that it has utilized. At this time, the BIOS redirection component 26 may also release memory or other computing resources. By releasing all resources prior to an actual conflict with the operating system 16, the BIOS redirection component 26 can ensure that no conflict will occur and that compatibility with the operating system 16 will be guaranteed. Once the computing resources have been released by the BIOS redirection component 26, redirection is terminated. Accordingly, the routine 500 continues from operation 516 to operation 518, where it ends.

Based on the foregoing, it should be appreciated that the various embodiments of the invention provide methods and systems for ensuring compatibility between an operating system and a BIOS redirection component. The above specification, examples and data provide a complete description of the manufacture and use of the composition of the invention. Since many embodiments of the invention can be made without departing from the spirit and scope of the invention, the invention resides in the claims hereinafter appended.

I claim:

1. In a computing system, a method for ensuring compatibility between an operating system and a BIOS redirection component, the method comprising:
    in conjunction with the execution of the BIOS redirection component, determining whether the operating system has allocated resources in a manner that indicates that a conflict between the BIOS redirection component and the operating system may occur; and
    in response to determining that the operating system has allocated resources in a manner that indicates that a conflict may occur, preemptively releasing resources allocated to the BIOS redirection component to eliminate the possible conflict.

2. The method of claim 1, wherein determining whether the operating system has allocated resources in a manner that indicates that a conflict between the BIOS redirection component and the operating system may occur comprises monitoring the contents of a memory location within the computing system to determine if the operating system has written to the memory location.

3. The method of claim 2, wherein the memory location is utilized to store at least a portion of an interrupt vector table.

4. The method of claim 3, wherein preemptively releasing resources allocated to the BIOS redirection component to eliminate the conflict comprises releasing one or more software interrupts utilized by the BIOS redirection component.

5. The method of claim 4, wherein preemptively releasing resources allocated to the BIOS redirection component to eliminate the conflict further comprises releasing one or more hardware interrupts utilized by the BIOS redirection component.

6. The method of claim 5, wherein the BIOS redirection component is operative to redirect screen displays generated by the computing system to a remote terminal and to receive input from the remote terminal and provide the input to the computing system.

7. A computer-readable medium having stored thereon computer executable instructions which, when executed by a computer, cause the computer to perform the method of claim 1.

8. A computer-controlled apparatus capable of performing the method of claim 1.

9. In a computing system, a method for ensuring compatibility between an operating system and a BIOS redirection component, the method comprising:
    examining one or more BIOS settings to determine if a BIOS redirection function is enabled for continued use within the computing system;
    in response to determining that the BIOS redirection function is enabled for continued use, executing the BIOS redirection component;
    in conjunction with the execution of the BIOS redirection component, determining whether the operating system has allocated resources in a manner that indicates that a conflict between the BIOS redirection component and the operating system may be imminent; and
    in response to determining that the operating system has allocated resources in a manner that indicates that a conflict may be imminent, preemptively releasing resources allocated to the BIOS redirection component in a manner to eliminate the possibility of a conflict.

10. The method of claim 9, wherein determining whether the operating system has allocated resources in a manner that indicates that a conflict between the BIOS redirection component and the operating system may occur comprises monitoring the contents of a memory location within the computing system to determine if the operating system has overwritten the memory location.

11. The method of claim 10, wherein preemptively releasing resources allocated to the BIOS redirection component comprises releasing one or more software interrupts utilized by the BIOS redirection component.

12. The method of claim 11, wherein preemptively releasing resources allocated to the BIOS redirection component further comprises releasing one or more hardware interrupts utilized by the BIOS redirection component.

13. The method of claim 12, wherein the memory location is utilized to store at least a portion of an interrupt vector table.

14. The method of claim 13, wherein the BIOS redirection component is operative to redirect screen displays generated by the computing system to a remote terminal and to receive input from the remote terminal and provide the input to the computing system.

15. A computer-readable medium having stored thereon computer executable instructions which, when executed by a computer, cause the computer to perform the method of claim 9.

16. A computer-controlled apparatus capable of performing the method of claim 9.

* * * * *